April 8, 1947. J. J. MACHADO 2,418,717
RECEPTACLE ATTACHMENT FOR CHILDREN'S VEHICLES
Filed Sept. 4, 1945

INVENTOR.
JOHN J. MACHADO
BY Gardner & Warren
his atty.

Patented Apr. 8, 1947

2,418,717

UNITED STATES PATENT OFFICE 2,418,717

RECEPTACLE ATTACHMENT FOR CHILDREN'S VEHICLES

John J. Machado, San Leandro, Calif.

Application September 4, 1945, Serial No. 614,391

4 Claims. (Cl. 224—29)

This invention relates to portable receptacles in which packages or other goods may be carried and has particular reference to such a device adapted for attachment to a perambulator-type vehicle.

It is an object of the invention to provide a shopping basket of the nature described which may be instantly attached to or detached from the vehicle.

Another object of the invention is to provide a shopping basket adapted for connection to a child's perambulator which will not increase the bulk of the vehicle excessively nor throw the vehicle out of balance when the basket is loaded with goods.

A further object of the invention is to provide a shopping basket, adapted for mounting on a perambulator, whose design is such that it will not impede free movement of the vehicle through narrow doorways or aisles.

Still another object of the invention is to provide a shopping basket for the purpose described which is designed to conform to the physical shape of a conventional perambulator in such a way that the maximum internal volume in the basket, commensurate with the maintenance of balance in the vehicle and its load, is obtained.

A still further object of the invention is to provide, in a device of the character described, means serving to permit use of the device as a manually transportable basket when it is detached from the vehicle.

Other objects and features of advantage will become apparent to those skilled in the art as the detailed description of the invention, hereunto annexed, proceeds. It is to be understood that the invention is not to be confined structurally to the form thereof herein shown and described as various other modifications thereof may be employed within the scope of the appended claims.

Referring to the drawing.

Figure 1:
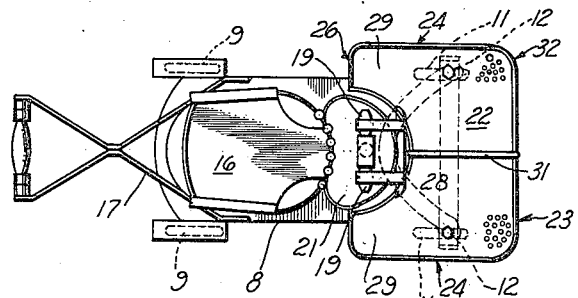
Figure 1 is a top plan view of a child's perambulator showing the package carrier of my invention mounted thereon.
Figure 2:
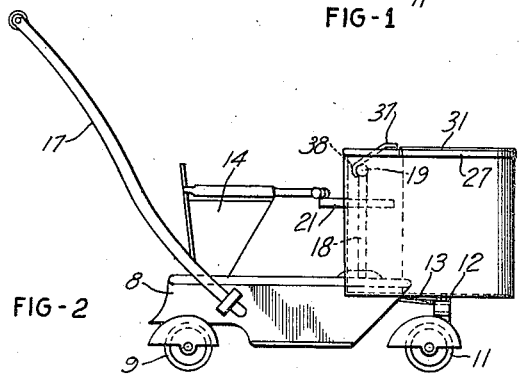
Figure 2 is a side elevational view of the structure shown in Figure 1.
Figure 3:
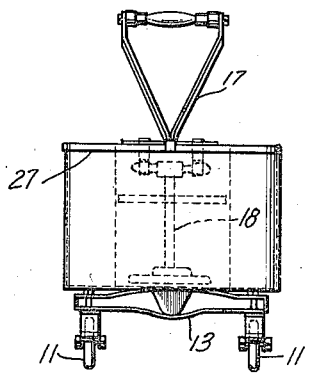
Figure 3 is a front elevational view of the structure shown in Figure 2.
Figure 4:
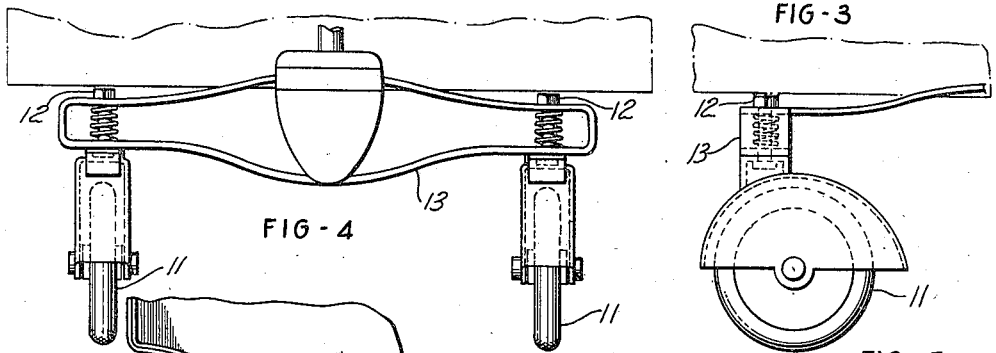
Figure 4 is an enlarged fragmental front elevational view of portions of the perambulator and package carrier showing the support for the latter on the vehicle.
Figure 5:
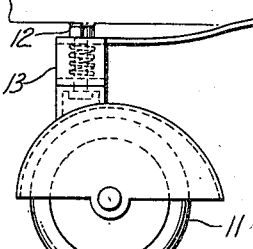
Figure 5 is a side elevational view of the structure shown in Figure 4.
Figure 6:
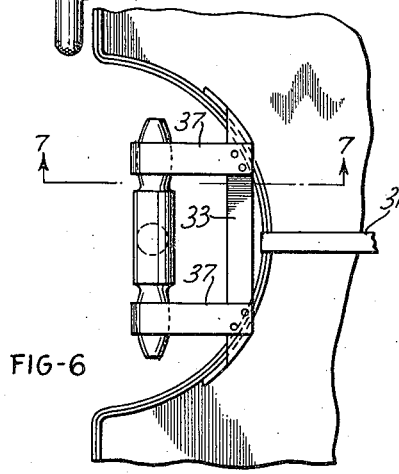
Figure 6 is a fragmental top plan view, to an enlarged scale, showing the means for attaching the package carrier to the vehicle.

The package carrier of my invention is designed particularly for attachment to the type of children's perambulator familiarly known to the trade as "Taylortot," which comprises a chassis 8 having rear ground-engaging wheels 9 and similar front wheels 11 mounted to caster about vertical pivots represented by the axes of bolts 12 carried by frame members 13 attached to and extending forwardly from the chassis 8. Structure 14 rising from the rear of the chassis provides a seat 16 and a handle 17 extending rearwardly and upwardly from the chassis provides means for propelling and guiding the vehicle. The conventional "Taylortot" is also provided with a stationary post 18, rising from the chassis in front of the seat 16, having thereon a pair of horizontally opposed handles or grips 19 and a tray 21 for the reception of small toys or other articles.

The package carrier comprises a substantially rectangular, perforated bottom 22 having attached and rising from the margins thereof a continuous, vertical sheet-like member shaped to form a front wall 23, side walls 24 and a rear wall 26. The wall member is specified as being sheet-like for the reason that it may either be constructed of solid sheet metal, wire cloth of the required rigidity or expanded metal. Irrespective of the construction material used, the upper edge of the basket thus formed is reinforced by the application thereto of a binder strip 27 which may be light strap iron as shown in the drawing or which, in the event that expanded metal or wire cloth is used, may be channel-shaped and squeezed or otherwise secured to the side wall material. The rear wall 26 of the basket is specially shaped so as to gain the maximum internal volume in the latter and this is accomplished by providing the wall sheet with an entrant portion 28 which partially surrounds the post 18 and its accompanying tray 21. This construction permits the basket to be extended, in the portions 29, rearwardly from the main portion thereof and also affects the balancing of the basket as will be presently described. Completing the basket structure is a strap 31 extending medially across the top opening of the basket and secured at its respective ends to the front and rear wall binder strips 27. The strap 31 serves the dual function of a strut, to resist relative collapse between the front and rear walls, and also that of a handle by means of which the basket may be transported manually. The above-mentioned perforations in the bottom 22 are for the purpose of venting the basket so as to prevent the accumulation therein of the usual small-sized rubbish particles, or liquids which may escape from packages being carried in the basket; and each corner 32 of the basket is substantially rounded so as to provide extra rigidity for the structure at these points.

Figure 7:
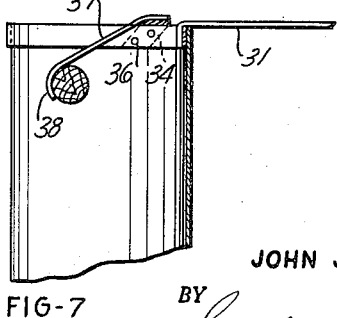
Figure 7 is a vertical sectional view taken in the plane indicated by the line 7—7 of Figure 6.

Means is incorporated in the basket providing for instant attachment or detachment of the latter to and from the carrier vehicle. Spanning the recess of the rear wall 26 is a bar 33, bent at its ends to form tabs 34 which are attached by any suitable means, such as rivets 36 to the end wall sheet and its binder strip 27, and secured at spaced points on the bar 33 is a pair of rearwardly and downwardly extending strap iron arms 37 each of which is provided at its extreme end, as is best shown in Figure 7, with a hook 38 shaped to extend rearwardly of and slightly under the grips or handles 19. The bottom 22 of the basket is designed to engage and rest on the frame members 13, which support the front wheel caster mountings, and the hook 38 is accurately positioned with relation to the bottom so as to coincide with and to engage the handles 19. The proportions of the basket and its placement on the vehicle are such that the center of gravity of the normal load placed in the basket will lie substantially directly above the points at which the bottom 22 contacts the underlying supporting structure. This serves to prevent any over-balancing of either the load or the vehicle and will effect an intimate engagement between the hooks 38 and the handles 19. The ease with which the basket may be removed and replaced is obvious when reference is had to the drawing, the only motions necessary for removal being a slight upward tilting of the basket followed by an upward lift along the vertical angle of the tilt, these movements being reversed for replacement.

Having thus described my invention in detail, what I claim as new and desire to secure by Letters Patent is:

1. A package carrier for attachment to a perambulator-type vehicle having a front wheel supporting structure and a post rising from the vehicle and carrying a grip element, comprising a basket having a main portion thereof situated in front of said post and integral portions thereof extending on each side of said post whereby the volumetric content of said basket is increased by said extended portions, said basket having a portion thereof to be engaged with said wheel supporting structure, and means carried by and extending from said basket for releasably engaging said grip element.

2. A package carrier for attachment to a perambulator-type vehicle having a front wheel supporting structure and carrying a grip element, comprising a perforated bottom plate resting on said wheel supporting structure, a vertical member rising from the margin of said bottom plate and forming, in conjunction with the latter, a basket having front, rear and side walls, said rear wall having therein a recessed portion enclosing said post whereby the interior of the basket is extended rearwardly on the respective sides of the post, and means carried by the basket and releasably engaged with said grip element.

3. A package carrier for attachment to a perambulator-type vehicle having a front wheel supporting structure and a post rising above said supporting structure and carrying a grip element, comprising a perforated bottom plate, a vertical member rising from the margin of said bottom plate and forming, in conjunction with the latter, a basket having front, rear and side walls, said rear wall having therein a recessed portion enclosing said post whereby the interior of the basket is extended rearwardly on the respective sides of the post, means carried by the basket and releasably engaged with said grip element, and said bottom plate being engaged with said wheel supporting structure at points wherein the center of gravity of the basket is positioned substantially vertically above the points of engagement of the bottom plate with the supporting structure.

4. A package carrier for attachment to a perambulator-type vehicle having a front wheel supporting structure and a post rising above said supporting structure and carrying a grip including a pair of substantially cylindrical, oppositely extending handles, comprising a perforated bottom plate resting on said wheel supporting structure, a vertical sheet member rising from the margin of said bottom plate and forming, in conjunction with the latter, a basket having front, rear and side walls, said rear wall having therein a recessed portion enclosing said post whereby the interior of the basket is extended rearwardly on the respective sides of the post, a pair of arms attached to said rear wall and extending toward said post, said arms having hooked portions therein engageable with said handles, and said basket being positioned on the vehicle so that the center of gravity of the basket substantially coincides with a vertical plane passing through the points of contact of the bottom plate with the wheel supporting structure.

JOHN J. MACHADO.

REFERENCES CITED

The following references are of record in the file of this patent:

UNITED STATES PATENTS

| Number | Name | Date |
|---|---|---|
| 2,180,143 | Fletcher | Nov. 14, 1939 |
| 2,290,099 | Gill | July 14, 1942 |
| 1,261,143 | McWilliams | Apr. 2, 1918 |
| 1,508,150 | Albus | Sept. 9, 1924 |

FOREIGN PATENTS

| Number | Country | Date |
|---|---|---|
| 123,534 | German | Aug. 26, 1901 |